United States Patent
Kellner et al.

(10) Patent No.: US 12,482,875 B2
(45) Date of Patent: Nov. 25, 2025

(54) MOTOR VEHICLE TRACTION BATTERY ARRANGEMENT

(71) Applicant: Dr. Ing. h.c. F. Porsche Aktiengesellschaft, Stuttgart (DE)

(72) Inventors: Philipp Kellner, Renningen (DE); Benjamin Passenberg, Rutesheim (DE); Ralf Keller, Pforzheim (DE); Thomas Fritz, Löchgau (DE); Immanuel Vogel, Steinheim (DE); Christopher Volkmer, Niefern-Öschelbronn (DE); Sascha Mostofi, Stuttgart (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 551 days.

(21) Appl. No.: 17/972,646

(22) Filed: Oct. 25, 2022

(65) Prior Publication Data

US 2023/0130699 A1   Apr. 27, 2023

(30) Foreign Application Priority Data

Oct. 26, 2021  (DE) .................... 10 2021 127 853.8

(51) Int. Cl.
  *H01M 10/647* (2014.01)
  *B60L 50/64* (2019.01)
  (Continued)

(52) U.S. Cl.
  CPC ........... *H01M 10/647* (2015.04); *B60L 50/64* (2019.02); *H01M 10/613* (2015.04);
  (Continued)

(58) Field of Classification Search
  CPC ...... B60L 50/64; B60L 58/26; H01M 10/613; H01M 10/625; H01M 10/647;
  (Continued)

(56) References Cited

U.S. PATENT DOCUMENTS

| 9,444,086 B2 | 9/2016 | Shimizu et al. |
| 11,387,482 B2 | 7/2022 | Aikata et al. |

(Continued)

FOREIGN PATENT DOCUMENTS

| CN | 209401710 U | 9/2019 |
| CN | 111477932 A | 7/2020 |

(Continued)

*Primary Examiner* — Victoria H Lynch
(74) *Attorney, Agent, or Firm* — Buchanan Ingersoll & Rooney PC

(57) ABSTRACT

A motor vehicle traction battery arrangement includes two cooling plates respectively disposed in a horizontal plane and a high-voltage battery module. The lower and upper horizontal walls of which are cooled directly by the cooling plates and which encases a plurality of identical rectangular battery cells in a rigid battery module housing. The battery cells are all configured such that they are plate-like and elongated, are parallel to one another in vertical planes (y,z) and each includes two small-area vertical end walls, two large-area vertical side walls and two medium-area horizontal walls. On its end face, each battery cell includes an anodic connecting element and a cathodic connecting element. At least two similar cell stacks including a same plurality of battery cells are provided, and are stacked such that their battery cell side walls adjoin one another. The battery cell horizontal walls directly adjoin a cooled battery module horizontal wall.

7 Claims, 2 Drawing Sheets

Figure 1:
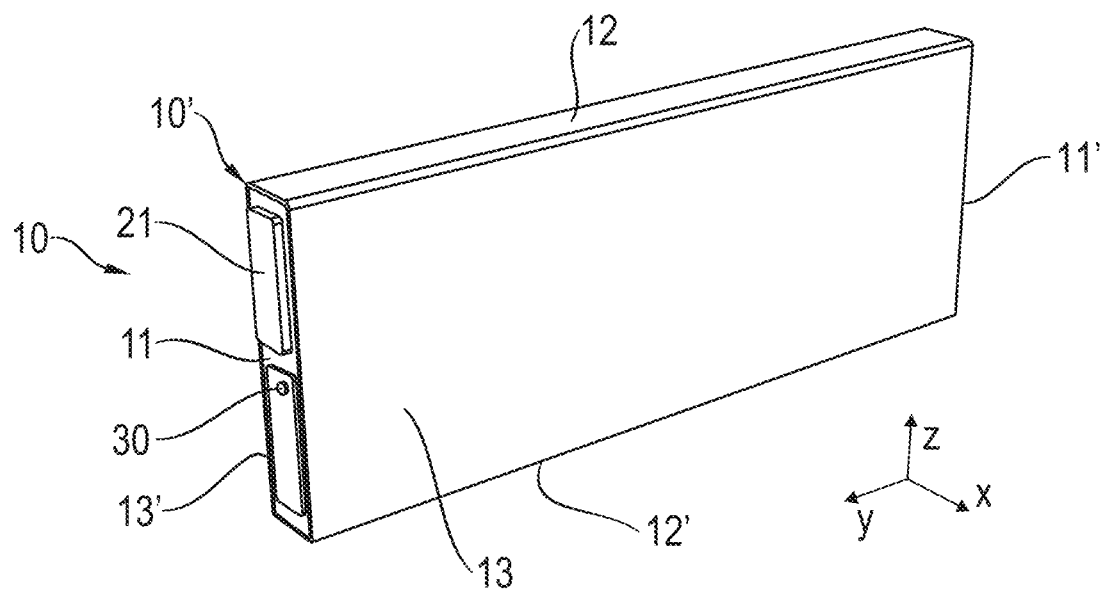

(51) Int. Cl.
  *H01M 10/613* (2014.01)
  *H01M 10/625* (2014.01)
  *H01M 10/653* (2014.01)
  *H01M 10/6554* (2014.01)
  *H01M 50/209* (2021.01)
  *H01M 50/233* (2021.01)
  *H01M 50/30* (2021.01)
  *H01M 50/548* (2021.01)
  *B60L 58/26* (2019.01)

(52) U.S. Cl.
  CPC ....... *H01M 10/625* (2015.04); *H01M 10/653* (2015.04); *H01M 10/6554* (2015.04); *H01M 50/209* (2021.01); *H01M 50/233* (2021.01); *H01M 50/30* (2021.01); *H01M 50/548* (2021.01); *B60L 58/26* (2019.02); *H01M 2220/20* (2013.01)

(58) Field of Classification Search
  CPC ........... H01M 10/653; H01M 10/6554; H01M 10/6555; H01M 10/6556; H01M 10/656; H01M 2220/20; H01M 50/209; H01M 50/233; H01M 50/24; H01M 50/249; H01M 50/30; H01M 50/548; Y02E 60/10
  See application file for complete search history.

(56) References Cited

U.S. PATENT DOCUMENTS

| | | | | |
|---|---|---|---|---|
| 2009/0142653 | A1* | 6/2009 | Okada | H01M 50/209 429/120 |
| 2020/0328387 | A1* | 10/2020 | Chung | H01M 50/271 |
| 2020/0343604 | A1* | 10/2020 | Lee | H01M 50/553 |
| 2021/0175572 | A1 | 6/2021 | He et al. | |
| 2021/0218082 | A1 | 7/2021 | Kubota et al. | |

FOREIGN PATENT DOCUMENTS

| | | |
|---|---|---|
| CN | 111613745 A | 9/2020 |
| DE | 102010035114 A1 | 4/2011 |
| DE | 102012217590 A1 | 3/2014 |
| DE | 112018003118 T5 | 3/2020 |
| WO | 2020066060 A1 | 4/2020 |

\* cited by examiner

MOTOR VEHICLE TRACTION BATTERY ARRANGEMENT

CROSS-REFERENCE TO RELATED APPLICATIONS

This application claims priority to German Patent Application No. 10 2021 127 853.8, filed Oct. 26, 2021, the content of such application being incorporated by reference herein in its entirety.

FIELD OF THE INVENTION

The invention relates to a motor vehicle traction battery arrangement comprising a cuboidal high-voltage battery module, which, combined in at least two cell stacks, comprises a plurality of cuboidal battery cells and is actively cooled by one or more adjoining cooling plates.

BACKGROUND OF THE INVENTION

A variety of cuboidal battery modules, in each of which two or more cell stacks respectively consisting of a plurality of battery cells are encased, are known from DE 11 2018 003 118 T5, DE 10 2010 035 114 A1, DE 10 2012 217 590 A1 and WO 2020/066060 A1, which are each incorporated by reference herein. The battery cells are cuboidal and each comprises a pair of small, a pair of medium sized and a pair of large cell walls. Each battery cell comprises an anodic connecting element and a cathodic connecting element, which are typically disposed on one or both medium-sized cell walls. The battery cells are therefore respectively cooled directly on only their small cell walls, so that the technically possible cooling capacity is correspondingly limited. Each battery cell comprises a degassing element, for example a bursting element, through which, in the event of degassing, the degassing flow is directed toward an adjacent battery cell.

SUMMARY OF THE INVENTION

The motor vehicle traction battery arrangement according to aspects of the invention, which has a good cooling capability, is formed by at least one high-voltage battery module and two cooling plates respectively disposed in a horizontal plane, wherein the lower and the upper horizontal wall of the high-voltage battery module are each cooled directly by a cooling plate. A plurality of identical cuboidal battery cells are encased in the rigid and rectangular or cuboidal battery module housing. The battery cells are respectively configured such that they are plate-like or disk-like and elongated. The vertical base planes of the battery cells are all parallel to one another in vertical planes. Each battery cell comprises two parallel small-area vertical end walls, two large-area vertical side walls and two medium-area horizontal walls. The area of the vertical end walls is smaller than that of the side walls or the horizontal walls. The area of the horizontal walls, in turn, is smaller than that of the side walls. The area of the side walls is particularly preferably at least three times the area of the horizontal walls.

On its end face, each battery cell comprises an anodic connecting element and a cathodic connecting element. The two aforementioned connecting elements can both be disposed on a single one of the two end walls. Alternatively, however, one connecting element is provided on the one end wall and the other connecting element is provided on the other end wall of the battery cell.

At least two similar cell stacks comprising a same plurality of battery cells are provided. The two cell stacks thus form a cell stack pair. The respective battery cells of a cell stack are stacked such that their battery cell side walls adjoin one another. A cell stack consists of at least two, particularly preferably at least three battery cells. The two cell stacks are disposed such that their end faces are adjacent to one another, i.e. such that the proximal end faces of the battery cells of the one cell stack are adjacent to and face the proximal end faces of the battery cells of the other cell stack. The distal end faces of the battery cells, on the other hand, adjoin, but do not touch, a vertical wall of the battery module housing.

A battery module particularly preferably comprises two such cell stack pairs which are disposed such that the side walls of the end-side battery cells in question adjoin one another, so that each battery cell comprises one respective end wall that directly adjoins a vertical wall of the battery module housing and an end wall that adjoins an end wall of another battery cell. Adjoining as used here does not necessarily mean directly in contact.

All of the battery cell horizontal walls directly adjoin a battery module horizontal wall cooled by the two cooling plates. All of the battery cell horizontal walls of all of the battery cells are thus free of electrical connecting elements and degassing elements; therefore their entire area is used to actively cool the battery cells. This makes it possible to implement a comparatively high absolute cooling capacity for cooling the high-voltage battery module, so that high continuous charging performances and high withdrawal capacities can be realized.

Each battery cell preferably comprises a respective functional degassing element only on its distal end face. This ensures that, in the event of degassing, the gas escaping through the degassing element is not directed directly at another adjacent battery cell. The degassing element can be configured as a suitable bursting element, for example.

Particularly preferably, a respective non-functional degassing element is provided on the proximal end walls or end faces of the battery cells, wherein the two non-functional degassing elements of the adjacent end walls are permanently covered and sealed in a gas-tight manner by at least one blocking body. There is thus no need to provide two different versions having different polarity orientations of the connecting elements with respect to the degassing element for the battery module; the entire battery module can instead be realized with a single type of battery cells. Therefore, each battery module comprises a respective degassing element on each of its two end faces, whereby, when the battery cell is installed, the one degassing element is functional and the other degassing element is non-functional.

Each battery cell preferably comprises an anodic connecting element on its one end wall and a cathodic connecting element on its other end wall. The two connecting elements of a battery cell are therefore not disposed on the same end wall. Most of the battery cells of the one cell stack are preferably physically and electrically connected in series with the connecting elements of their proximal end walls to the connecting elements of the immediately adjacent proximal end walls of the other cell stack.

It is preferably provided that a respective thermally conductive paste layer be provided between the battery module horizontal wall and the adjoining battery cell horizontal wall which thermally couples the battery module horizontal wall in question to the battery cell horizontal wall in question and the adjoining cooling plate. The thermal conduction between the battery cell horizontal wall in question and the cooling plate is thus improved.

BRIEF DESCRIPTION OF THE DRAWINGS FIGURES

Figure 2:
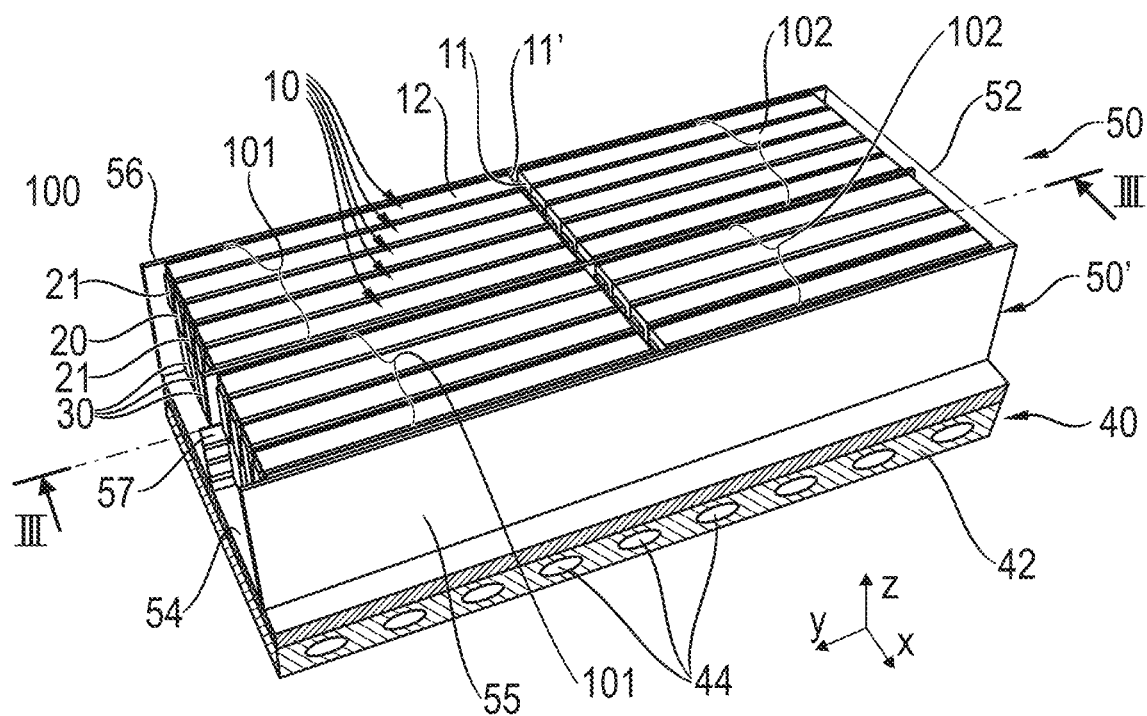
Figure 3:
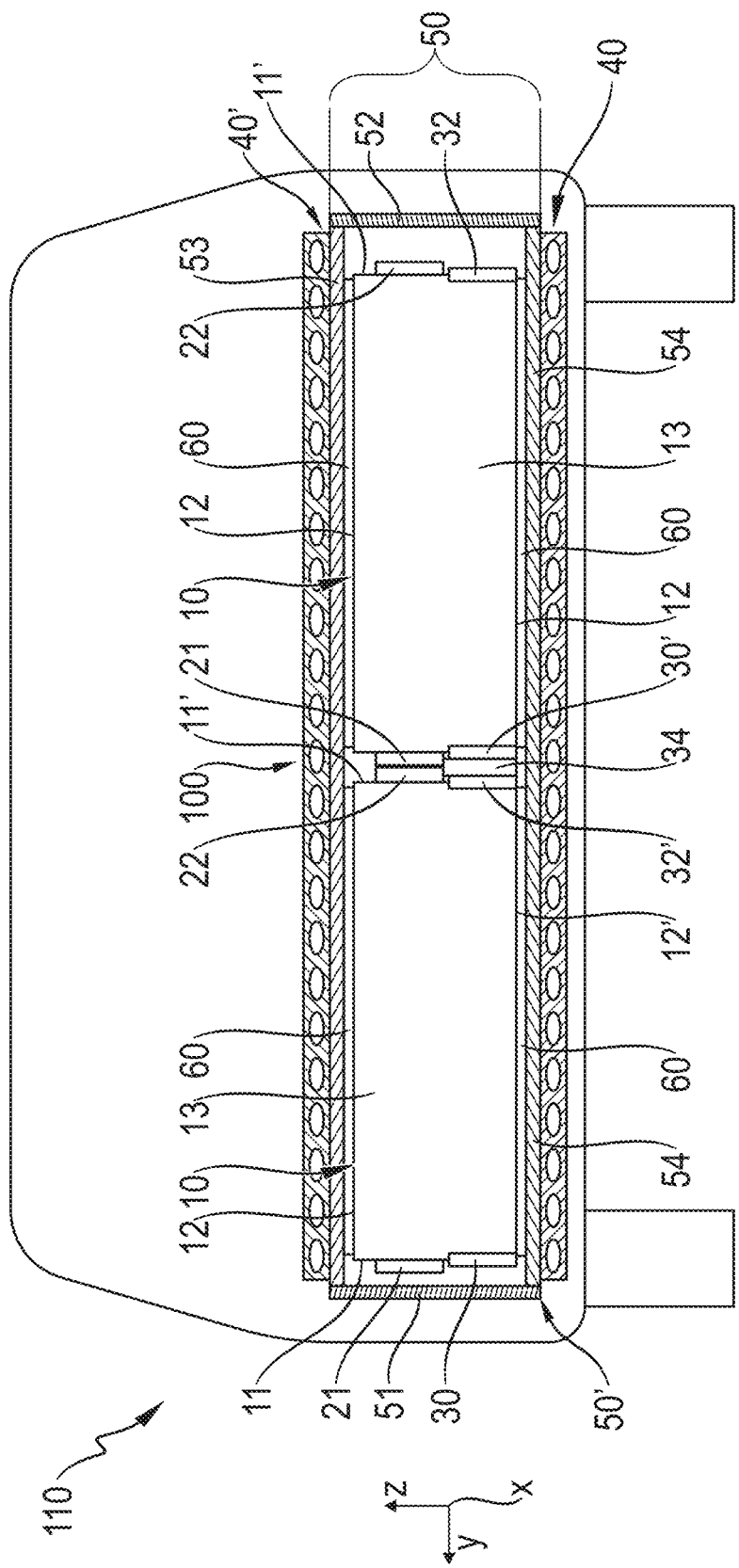

A design example of the invention will be explained in more detail in the following with reference to the drawings. Here:

FIG. 1 shows a perspective illustration of a battery cell according to aspects of the invention, FIG. 2 shows a perspective view of a vehicle traction battery arrangement according to aspects of the invention comprising a high-voltage battery module that is shown partially open and has four cell stacks which are each composed of a plurality of battery cells of FIG. 1, and FIG. 3 shows a vertical longitudinal section III-III of the traction battery arrangement of FIG. 2.

DETAILED DESCRIPTION OF THE INVENTION

FIGS. 2 and 3 show a motor vehicle traction battery arrangement 100, which is disposed in the floor area of a motor vehicle 110 comprising an electric traction drive. The traction battery arrangement 110 is substantially rectangular or cuboidal, and is comprised of a rectangular or cuboidal high-voltage battery module 50 having an adjoining upper cooling plate 40' which is disposed in a horizontal plane and adjoins an upper battery module horizontal wall 53 and a lower cooling plate 40 which adjoins the lower battery module horizontal wall 54. A cooling plate 40,40' is substantially formed by a cooling plate body 42 which defines a plurality of cooling channels 44 for a circulating cooling liquid. A thermally conductive paste layer can respectively be provided between the cooling plate 40',40 and the horizontal wall 53,54 in question, which thermally couples the horizontal wall 53,54 in question to the cooling plate 40',40 in question. A plurality of battery modules 50 can be provided, which are preferably disposed in a single horizontal plane XY. The battery module 50 or the battery modules can be bolted to the body or the floor assembly of the motor vehicle and form a load-bearing part of the body.

The fluidically closed and rigid metal battery module housing 50' is formed by the two aforementioned horizontal walls 53,54, two vertical end walls 51,52 and two vertical longitudinal walls 55,56. On the inside, the battery module housing 50' further comprises a vertical partition 57, which is disposed centrally between and parallel to the two vertical longitudinal walls 55,56.

FIG. 2 shows the traction battery arrangement 100 open, without the upper cooling plate 40', the upper horizontal wall 53 and a left vertical wall 51.

Two pairs of cell stacks 101,102 are housed within the battery module housing 50', whereby the one pair is separated from the other pair by the vertical partition 57. Each cell stack 101,102 is formed by a plurality of identical, stacked battery cells 10.

FIG. 1 shows a cuboidal and fluid-tight battery cell 10 in a perspective view. The battery cell 10 is configured to be plate-like or disk-like and elongated, stands in a vertical plane YZ and comprises a cuboidal housing 10' having small-area end walls 11,11' which are parallel to one another in vertical planes XZ, two large-area vertical side walls 13,13' which are perpendicular thereto and stand in vertical planes YZ and two medium-area horizontal walls 12,12' which are perpendicular thereto and stand in a horizontal plane XY. The area of a large-area side wall 13,13' is at least five times the area of a medium-area horizontal wall 12,12'. A respective electrical connecting element 21,22, and below it a degassing element 30,32; 30',32', is disposed on each end wall 11,11'. The one connecting element of the battery cell 10 is an anodic connecting element 21, whereas the other connecting element is a cathodic connecting element 22.

As can be seen in FIGS. 2 and 3, a cell stack 101,102 is formed by a plurality of battery cells 10 which are stacked such that their battery cell side walls 13,13' adjoin one another, whereby the polarity of the adjacent connecting elements 21,22 respectively alternates. The two cell stacks 101,102 of a pair are disposed such that their end faces are adjacent to one another. All of the battery cell horizontal walls 12,12' directly adjoin a cooled battery module horizontal wall 53,54. A respective thermally conductive paste layer 60 is provided between the battery cell horizontal walls 12,12' and the adjacent battery module horizontal walls 53,54, which improves the heat transfer between the battery cells 10 and the battery module horizontal wall 53,54 in question or the cooling plate 40,40' in question.

As shown in FIG. 3, the proximal degassing elements 30',32' are permanently sealed in a gas-tight manner by a blocking body 34, so that the proximal degassing elements 32', 30' are non-functional.

What is claimed:

1. A motor vehicle traction battery arrangement comprising:
    a high-voltage battery module including a plurality of identical cuboidal battery cells encased in a rigid battery module housing; and
    two cooling plates respectively disposed in a horizontal plane, wherein lower and upper horizontal walls of the battery module are cooled directly by the cooling plates,
    wherein the plurality of battery cells are each plate-shaped and elongated, and each battery cell comprises two vertical end walls, two vertical side walls, two horizontal walls, an anodic connecting element on one of the end faces of the battery cell, and a cathodic connecting element on one of the end faces of the battery cell,
    wherein the plurality of battery cells are oriented parallel to one another in vertical planes,
    wherein the plurality of battery cells are arranged in at least two cell stacks, and the at least two cell stacks are stacked such that side walls of the plurality of battery cells adjoin one another,
    wherein the two cell stacks are disposed such that the end faces are adjacent to one another,
    wherein all of the battery cell horizontal walls directly adjoin a horizontal wall of the cooled battery module,
    wherein each battery cell comprises an unsealed and functional degassing element disposed only on a distal end face of the battery cell, and
    wherein each battery cell comprises a sealed and non-functional degassing element disposed on a proximal end face of the battery cell.

2. The motor vehicle traction battery arrangement according to claim 1, wherein two adjacent non-functional degassing elements are permanently sealed in a gas-tight manner by a blocking body.

3. The motor vehicle traction battery arrangement according to claim 1, wherein, for each battery cell, the anodic connecting element and the cathodic connecting element are disposed on different end faces of the battery cell.

4. The motor vehicle traction battery arrangement according to claim 3, wherein the anodic and cathodic connecting elements of one cell stack of the at least two cell stacks are all directly and electrically connected with the anodic and cathodic connecting elements of the other cell stack of the at least two cell stacks.

5. The motor vehicle traction battery arrangement according to claim 1, further comprising a thermally conductive paste layer disposed between the battery module horizontal wall and an adjoining battery cell horizontal wall which thermally couples the battery module horizontal wall to the battery cell horizontal wall.

6. The motor vehicle traction battery arrangement according to claim 1, wherein, for each battery cell, the vertical end walls are smaller than the horizontal walls, and the horizontal walls are smaller than the vertical side walls.

7. A motor vehicle comprising the motor vehicle traction battery arrangement according to claim 1.

* * * * *